July 6, 1926.

P. C. POMMER 1,591,433

HANDPIECE FOR GEAR SHIFTING LEVERS

Filed March 12, 1925

INVENTOR
Paul C. Pommer
BY
Edward R. Inman
ATTORNEY

Patented July 6, 1926.

1,591,433

UNITED STATES PATENT OFFICE.

PAUL C. POMMER, OF FRANKLIN, PENNSYLVANIA.

HANDPIECE FOR GEAR-SHIFTING LEVERS.

Application filed March 12, 1925. Serial No. 14,962.

This invention relates to a hand-form grip or hand-piece for the gear-shifting lever of automobiles and the object of the invention is, to provide a more facile, convenient and easily-manipulated hand-piece for the purpose set forth than the spherical handle now almost universally employed.

The construction of this improved handpiece and the method of attaching same to a gear-shifting lever are hereinafter described with sufficient clearness and accuracy to enable those skilled in the arts to which its construction and use respectively relate, to make and use the same, reference being had to the accompanying drawings which form a part hereof, and in which.

Figures 1, 2, 3:
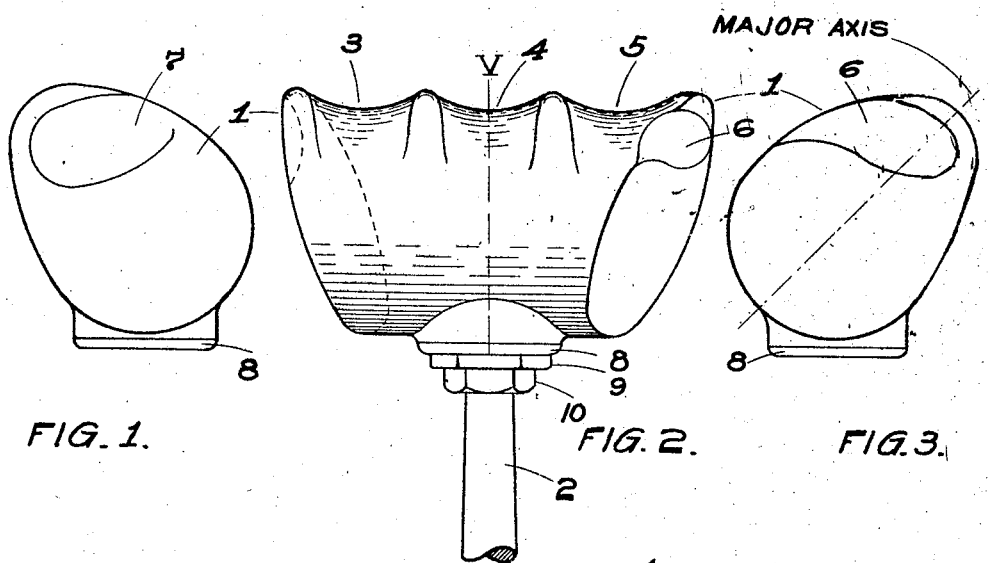
Fig. 1 is a left-end view of my improved hand-piece or grip.
Fig. 2 is an elevation of the rear face of the hand-piece, and is the face which is turned toward the driver of the car.
Fig. 3 is a right end view.
Figure 4:
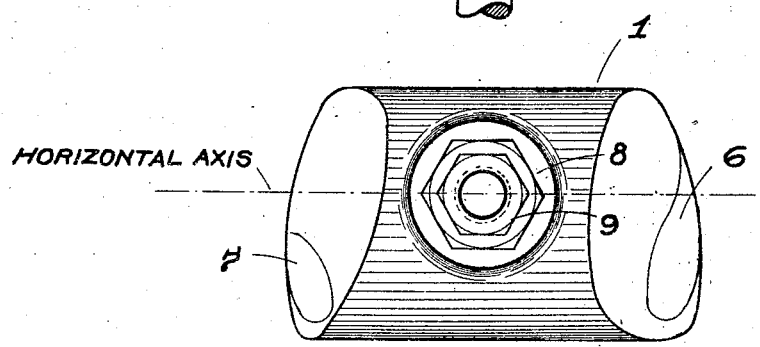
Fig. 4 is a bottom view.
Figure 5:
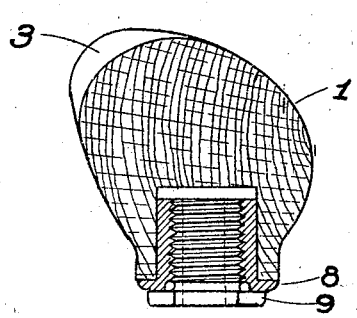
Fig. 5 is a vertical, transverse section, on line V of Fig. 2.

The construction illustrated in said drawings is substantially as follows:

The hand-piece consists of an oblong body 1 that is adapted to be attached to the gear-shifting lever 2 of an automobile. The longer axis of said body 1 is arranged horizontally and in parallel relation to the dashboard of the car and to the driver's seat. The transverse section of said body is substantially ovoid or egg-shaped with its longer curve positioned lowermost and the longer or major axis of said ovoid form disposed at an angle of 45 degrees to the horizontal and away from the driver of the automobile, as clearly shown in Figs. 1 and 3. The upper face of said body, which is the smaller curve of said ovoid form is provided with a plurality of finger depressions, termed saddles, as 3, 4 and 5 in which the first, second and third fingers of the right hand rest when the hand-piece is grasped; in the right-hand end of said body is a finger depression 6 for the little finger and in the left-hand end is formed a depression 7 for the thumb.

From the foregoing description it will be readily understood that my improved handpiece conforms, at the upper portion thereof, to the inner face of the hand and its digits when partly closed, and because of this it can be grasped with ease, facility and certainty of manipulation, and with slight grip of the operator's hand.

The upper end of nearly all gear-shifting levers is threaded for the purpose of attaching the spherical hand-piece heretofore employed, and the portion thus threaded differs somewhat, in different makes of automobiles, in diameter and threads per inch, consequently in my improved hand-piece provision is made to meet this varying condition so that it may be readily applied to all makes of automobiles. For this purpose I provide said body 1 with an internally-threaded socket 8 for the reception of an externally-threaded bushing 9, that may, in turn, be internally-threaded to fit the thread upon any shifting lever.

A nut-lock 10 may be employed to secure said hand-piece firmly in position.

I claim the following:

1. A hand-piece for the gear-shifting lever of an automobile comprising an oblong body of ovoid cross-sectional form having finger-saddles or depressions in the smaller curved surface of said ovoid form, said body being adapted to be attached to the gear-shifting lever of an automobile with said finger-saddles disposed upwardly.

2. A hand-piece for the gear-shifting lever of an automobile comprising an oblong body of ovoid cross-sectional form adapted to be attached to said gear-shifting lever with the longitudinal axis of said oblong body disposed in substantially parallel relation to the driver's seat and the major axis of said ovoid form disposed at an angle of substantially 45 degrees to the horizontal and its smaller curve positioned uppermost, said curve being provided with finger depressions for the first, second and third fingers, also a depression in one end of said body for the little finger, and another depression in the opposite end of said body for the thumb.

In testimony whereof I affix my signature.

PAUL C. POMMER.